UNITED STATES PATENT OFFICE.

PAUL VON KRYSTOFFOVITCH, OF ST. PETERSBURG, RUSSIA.

ARTIFICIAL STONE.

SPECIFICATION forming part of Letters Patent No. 392,084, dated October 30, 1888.

Application filed November 25, 1887. Serial No. 256,101. (No specimens.)

*To all whom it may concern:*

Be it known that I, PAUL VON KRYSTOFFOVITCH, a subject of the Emperor of Russia, residing at the city of St. Petersburg, in the Empire of Russia, have invented certain new and useful Improvements in the Process of Making Artificial Granite Stones, of which the following is a specification.

This invention relates to improvements in making artificial stone; and it consists, essentially, in mixing pulverized fire-clay with a powder produced by pulverizing burnt red clay, water being added to the mixture of pulverized clay and burnt red clay for the purpose of forming a stiff plastic mass, which is formed into bricks that are dried until they resist the pressure of the finger, are then subjected to extremely great pressure, and are then fully dried and burned. Of the raw materials used, the fire-clay must have the following properties: Its co-efficient of fire-resistance must not be less than four; the loss in weight by burning must not be over ten per cent.; the percentage of oxide of iron must not be over one and one-half per cent., and the quantity of silicates must not be less than fifty per cent. The red clay must have the following properties: The co-efficient of resistance to fire must be from fifty one-hundredths to one; the loss in weight by burning must not be over five to six per cent.; the quantity of iron oxide contained therein thirteen to seventeen per cent., and the quantity of the silicates forty-five to fifty per cent.

The raw material is treated in the following manner: The fire-clay is dried, ground, and sifted, so as to be pulverized or granulated. The red clay is mixed with sufficient water to form a uniform paste, which is formed into bricks. These are dried and then burned in a furnace, the temperature of which must be equal to that at which the said clay begins to melt. This temperature is reached when a broken brick from the furnace shows a reddish-black color in its cross-section. The edges of the bricks should be somewhat fused before the bricks are removed from the furnace. The bricks must not be burned for a longer time, as otherwise they would blister and crack. If the bricks are burned properly they form a homogeneous, firm, and hard mass. These burned bricks are then pulverized and sifted. The powder obtained from the bricks and the powdered or pulverized clay are then mixed in the following proportions: one and one-half part to two parts of the pulverized fire-clay, and three-fourths part to one part of the pulverized burnt red clay are thoroughly mixed in a dry state. Then water is added to form a stiff plastic mass, which is then stacked in heaps and covered with moistened canvas for from twenty-four to forty-eight hours. The mass is then thoroughly mixed and worked; then again stacked and covered with wet canvas for about twenty-four hours. Out of this mass bricks are made, which should all have the same size and weight. These bricks are thoroughly dried until they can resist the pressure of the finger. These dried bricks are then subjected to great pressure on all sides in a suitable press and shaped according to the desired pattern—for instance, as a paving-stone, roofing-tile, &c. The pressed blocks are then dried until they have fully hardened. They are then placed in the furnace on edge, and each row is sprinkled with granules of fire-clay to prevent the stones baking together. The temperature in the furnace must be equal to 1,000° to 1,200° centigrade. The following takes place in the furnace: The fire-proof clay, which is not affected by the heat, remains unchanged. The burnt red-clay melts and becomes fluid; but as the particles of the burnt red clay are thoroughly mixed with the particles of fire-clay the bricks do not lose their shape, but each particle of fire-clay is thoroughly surrounded by the fluid mass of molten burnt red clay, and thus the particles of fire-clay are bound firmly together. The bricks are then cooled as slowly as possible, so as to prevent cracks. The bricks consist of a homogeneous mass of extraordinary hardness, and when broken show a black color at the broken part. These bricks can be polished to have the appearance of polished marble.

Various colors can be given to the bricks, as this color depends upon the temperature of the furnace and the greater or less quantity of burnt red clay in relation to the fire-clay. The following colors can be readily made: Black, reddish-black, brown of various shades, and gray of various shades. If the burnt red clay is mixed with the fire-clay as kernels of the size of poppy-seed up to the size of pin-heads and all dust is removed as much as possible, the stone will have the appearance of black marble or granite with white spots. In this case the red clay does not melt entirely, as the larger kernels only melt on the surface and the interior part remains intact and forms the spots. If very fine powders are used, the stones will have the appearance of Labrador feldspar.

Pipes and tiles made in this manner have great strength and need have but very little thickness.

Having thus described my invention, I claim as new and desire to secure by Letters Patent—

Artificial stone composed of powdered burnt red clay and powdered or granulated fire-clay mixed and baked together in about the proportions given, substantially as set forth.

In testimony whereof I have signed my name to this specification in the presence of two subscribing witnesses.

PAUL VON KRYSTOFFOVITCH.

Witnesses:
  B. ROI,
  G. MAWROCKI.